Sheet 2 -2 Sheets.

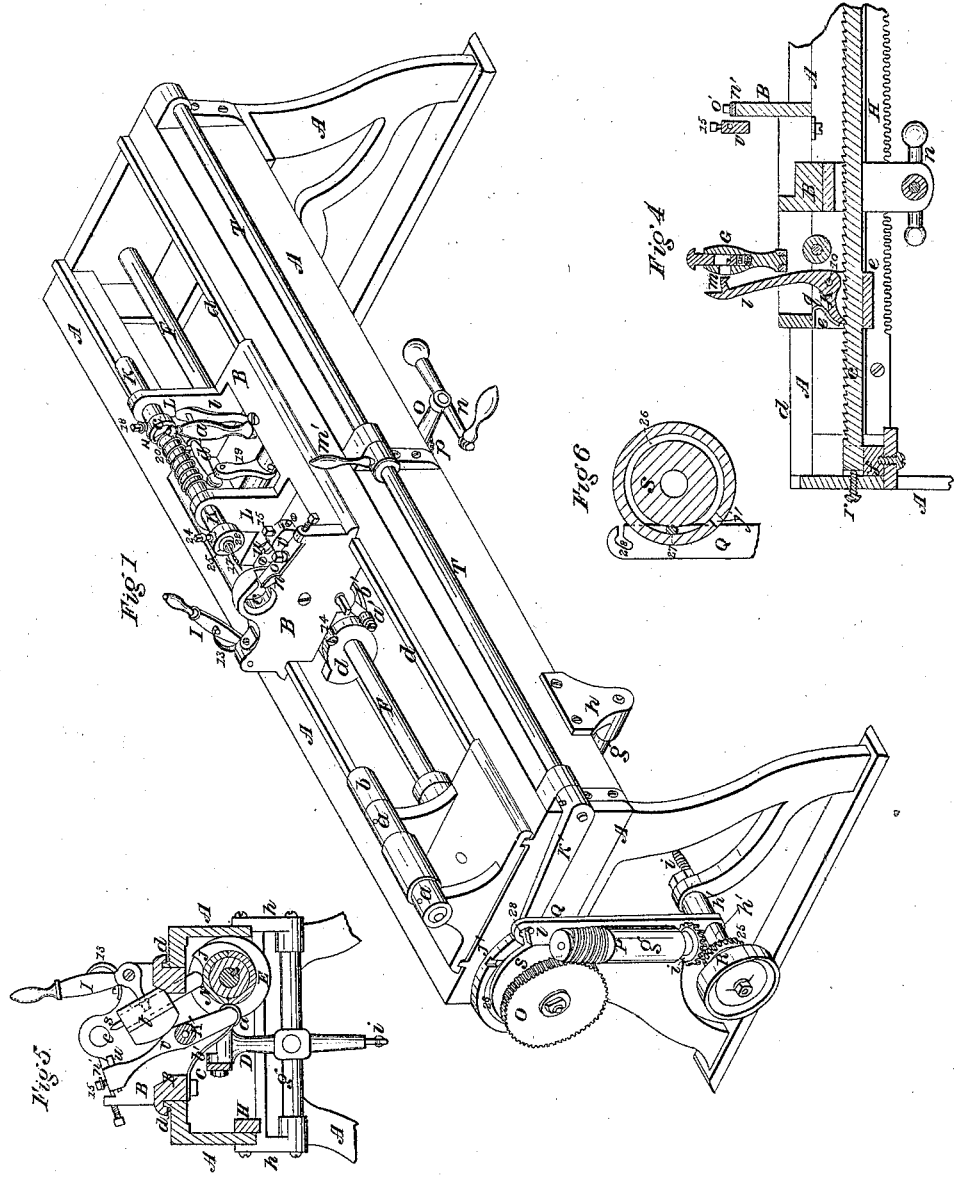

L. H. Dwelley,
Gage Lathe.

Nº 62,618.             Patented Mar. 5, 1867.

Witnesses:
R. H. Schumacher
N. W. Stearns

Inventor:
Lucius H. Dwelley

United States Patent Office.

LUCIUS H. DWELLEY, OF DORCHESTER, MASSACHUSETTS.

Letters Patent No. 62,618, dated March 5, 1867.

IMPROVEMENT IN WOOD-TURNING LATHES.

The Schedule referred to in these Letters Patent and making part of the same.

TO ALL WHOM IT MAY CONCERN:

Be it known that I, LUCIUS H. DWELLEY, of Dorchester, in the county of Norfolk, and State of Massachusetts, have invented an improved Machine for Turning Spools, of which the following is a full, clear, and exact description, reference being had to the accompanying drawings, making part of this specification, in which—

Figure 1 is a perspective view of my improved machine.

Figure 4 is a longitudinal vertical section of a portion of the same on the line $y\ y$ of fig. 2.

Figure 5 is a transverse section of the machine on the line $z\ z$ of fig. 2, looking in the direction of the red arrow.

Figure 6, detail to be referred to.

In machines for turning spools, as heretofore constructed, the rounding, body, and severing cutters have been attached to a sliding carriage, and brought into action by means of a lever or levers, while the boring tool was secured to an independent carriage, operated by hand to bring the borer up to its work.

My invention has for its object to produce a machine for turning spools which will perform the whole operation automatically with great rapidity and accuracy; and consists in attaching the several cutting tools and the boring tool to a single carriage, said tools being operated at the required times by means of cams attached to and moving with the carriage, the cams being actuated by a shaft passing through and connected with them by means of a spline and feather, the feed mechanism of the carriage being actuated by another cam on the same shaft; and my invention also consists in a peculiar device for arresting the whole of the mechanism, with the exception of the chuck and its arbor, when it is required to insert a fresh stick, or when otherwise necessary.

To enable others skilled in the art to understand and use my invention, I will proceed to describe the manner in which I have carried it out.

Figure 3:
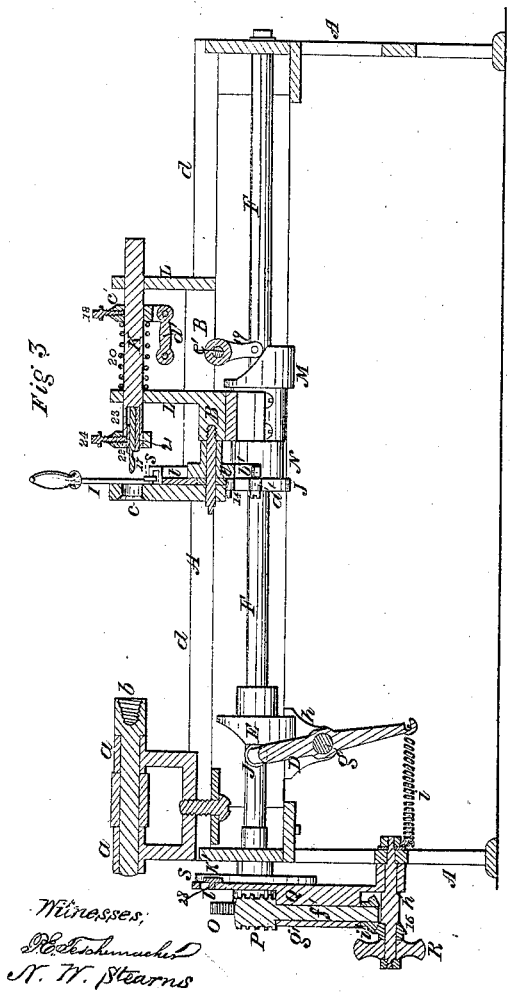
Figure 3 is a longitudinal vertical section of the same on the line $x\ x$ of fig. 2.

In the said drawings, A is the framework of the machine in bearings, $a$, secured to one end of which runs the arbor of the screw-chuck $b$, which is revolved by means of a belt, (not shown,) and carries one end of the stick to be operated upon, the other end of the stick being supported in a tunnel-shaped opening or rest, $c$, formed in the end of a traversing carriage, B, which slides on ways, $d$, and carries the several cutting and boring tools. The carriage B is fed forward at the required intervals, so as to cause the end of the stick to project beyond the tubular rest $c$ a sufficient distance for a spool, in the following manner: C is a horizontal toothed bar which passes through a guide, $e$, attached to the carriage, one end being supported in a rest, $f$, projecting from the inside of the framework, while the other end is attached to a rocker-arm or lever, D, secured to a shaft, $g$, which rests in bearings, $h$, attached to the framework; and this lever D is rocked against the resistance of a spring, $i$, so as to move the toothed bar by means of a cam, E, on the main shaft F, which strikes a friction-roll, $j$, as seen in fig. 3. The forward movement of the bar C is communicated to the carriage B by means of a pawl, $k$, fig. 4, which is pivoted to the carriage at 10, and engages with the toothed bar, its upper end forming a lever, $l$. This lever is furnished with a catch, $m$, which enters a slot in the post G, where it is retained by a spring-catch, 11, which thus holds the pawl up out of the teeth of the bar C, when the carriage is free to be moved in either direction by revolving the hand-crank $n$, which is attached to the shaft $o$ of a pinion, $p$, that engages with a rack-bar, H, on the under side of the framework.

Figure 2:
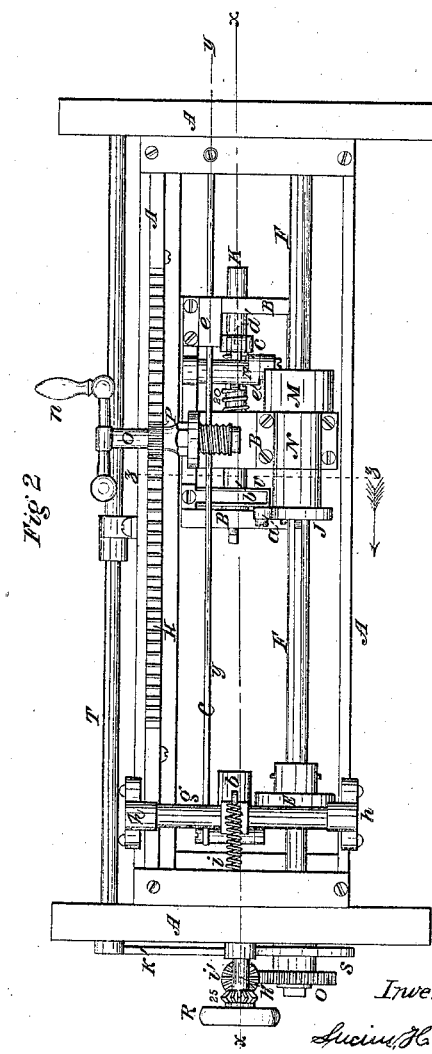
Figure 2 is a plan of the under side of the machine.

When it is desired to throw the feed into action the catch 11 is depressed, so as to release the lever $l$ and allow the pawl $k$ to engage with the toothed bar C, a spring, $q$, serving to keep the pawl in contact with the bar. In case a greater amount of feed is required, the throw of the bar C may be varied by means a gauge or set-screw, $r$, which allows it to be carried back by the spring $i$ a sufficient distance to permit the pawl $k$ to drop into every second notch. The notches may, however, be made much finer, and the carriage be advanced one, two, or more notches at a time, in accordance with the amount of feed required. $s$ is the severing cutter, by which the finished spools are separated from the stick. This cutter slides in an inclined guide, $t$, secured to the carriage B, and is operated at certain times by a hand-lever, I, which, together with the cutter $s$, is retained in the position seen in figs. 1, 3, and 5, by a spring, 13. The cutter $s$ is, however, operated automatically by a cam, J, which strikes a friction-roll, 14, on its lower extremity, and raises it to sever the spool from the stick as required. $u$ is the body cutter, which is of such a form as to give the required shape to the spool, and is secured to a lever or holder, $v$, by means of a set-screw, 15. This lever is pivoted at 16, (fig. 5,) and carries, at its lower end, a roll, $a'$, which is struck by the cam J, which is so formed as to bring the cutter up to its work, after which it is withdrawn by means of a flat spring, $b'$. The spindle or shaft K, which carries the auger or boring tool 17, slides in bearings, L, rising from the carriage B, and is brought up to its work in the following manner: $c'$ is a ring or collar, secured to the spindle by means of a set-screw, 18, and having lugs projecting from its under side, to which is pivoted the connecting-rod $d'$, the opposite end of which is attached to a lever, 19, pivoted on a stud, $e'$, projecting from the carriage B; the lower end of the lever 19, which carries a friction-roll, being moved at the required times by means of a cam, M, which is so formed as to hold the auger up to form an axis for the spool to revolve on while being turned down by the cutter $u$, after which the spindle K is withdrawn by means of the spiral spring 20, which surrounds it, and is confined between the collar $c'$ and bearing L. The two cams J M are made of one piece of metal, which is turned down in the centre, and runs in a box, N, on the under side of the carriage B; and these cams are revolved by means of the main shaft F, which is connected with them by means of a spline and feather, as seen in figs. 2 and 5, the cams being thus allowed to slide freely along the shaft F as the carriage is fed up. The auger 17 projects out from a cylinder, 21, on the outer end of which is formed a cutter, 22, to square and finish the end of the spool, the cylinder 21 being provided with an open slot, cut down to the centre, in which fits a block, 23, (fig. 3,) which rests on the auger, and is pressed down by means of a set-screw, 24, which serves the double purpose of holding the cylinder 21, with its cutter, in place in the spindle K, and also the auger in the end of the cylinder, while it also affords a ready means of adjusting and securing either in the exact position required. It is evident that tools different from those described may be attached to the spindle K if required.

The manner in which the whole of the mechanism, with the exception of the chuck and its arbor, is arrested when it is desired to insert a fresh stick, or when otherwise necessary, will now be described. O is a gear, which is secured to one end of the shaft F outside the framework, and is driven by a worm, P, on the end of a shaft, $f'$, which runs in a long bearing, $g'$, on a lever, Q, pivoted to a stud, $h'$, projecting from the framework, and carries at its lower end a bevel-gear, $i'$, which is driven by another bevel-gear, 25, connected with the driving-pulley R, which runs loosely on the stud $a'$. S is a disk, which is secured to the shaft F, between the gear O and the framework, and has cut in its face an annular groove, 26, (fig. 1,) in which fits a pin, 27, (fig. 6,) projecting from the lever Q, by which means the worm P is prevented from being thrown out of gear with the cog-wheel O. $j'$ is a notch, cut from the groove 26 to the periphery of the wheel O, so that when the notch is brought into a position opposite to the pin 27, the lever Q may be moved back from the wheel O to disengage the worm P by means of a lever, $k'$, carrying the pin $l'$ on its outer end, which plays in an inclined slot, 28, in the upper end of the lever Q. The lever $k'$ is secured to one end of a long shaft, T, having its bearings in the framework, and this shaft is rocked to throw the worm in or out of gear by means of a handle, $m'$, the position of the notch $j'$ being such that the mechanism can only be thrown out of gear when the cutters $s$ $u$ and auger 17 are withdrawn, as seen in fig. 1. $n'$ is a cutter, which is secured to the carriage B by a screw, $o'$, and projects slightly into the tubular rest $c$, so as to round the stick as it passes through.

*Operation.*

The pawl $k$, being raised out of the teeth of the bar C, the carriage B is run back by turning the hand-crank $n$. The operator then inserts one end of a stick (its ends having been previously rounded) into the tunnel-shaped rest $c$, and the carriage is moved forward by hand until the opposite end of the stick enters the tapering screw-chuck $b$, by which it is revolved with great rapidity. The carriage is then moved still further forward by hand until the end of the stick projects a short distance beyond the rest $c$, being rounded by the cutter $n'$ as it passes through. The catch 11 is then depressed so as to allow the pawl $k$ to engage with the toothed bar C, when the severing cutter $s$ is brought up by means of the hand-lever I to square the end of the stick; and the mechanism which operates on the spool is thrown into action by means of the handle $m'$ on the shaft T, as before described. This causes the carriage to be fed forward automatically by means of the toothed bar C a distance sufficient to cause the end of the stick to project beyond the rest $c$ the length required for a spool, when the auger 17 and cutter 22 are brought up to bore the hole and square the end of the spool, remaining in that position until the body cutter $u$ is brought up to turn the spool down to the required form. The severing cutter $s$ is then brought up by the cam J, and the cutter $u$ withdrawn, when the auger 17 and cutter 22 are carried back by the spring 20, and the severing cutter $s$ cuts off the finished spool, which falls out of the machine. The carriage is then again fed forward, and the operation continues until the stick is used up, when the feed of the carriage is arrested automatically, the pawl $k$ having arrived at that portion of the bar C not provided with teeth. The carriage is then run back by means of the hand-crank $n$, a fresh stick is inserted without stopping the revolution of the chuck $b$, and the operation continues as before.

*Claims.*

What I claim as my invention, and desire to secure by Letters Patent, is—

1. I claim the combination of the shaft F with the cam M, traversing thereon and revolving therewith, lever 19, and sliding spindle K, with its tool or tools, substantially as described.

2. I also claim the combination of the shaft F with the cam J, traversing thereon and revolving therewith, and the vibrating cutter holder $v$, with its cutter $u$, for the purpose set forth.

3. I also claim the combination of the shaft F with the cam J, traversing thereon and revolving therewith, with the severing cutter $s$, as described.

4. I also claim the automatic feed mechanism, consisting of the cam E, rocker-arm D, spring $i$, or its equivalent, toothed bar C, pawl k, and gauge r, in combination with the traversing carriage B, when such carriage carries all the tools required to turn, bore, and sever the spool from the stick, substantially as described.

5. I also claim the combination of the auger 17, slotted cylinder 21, with its cutter 22 on its end, and set-screw 24, substantially as and for the purpose set forth.

6. I also claim the mechanism consisting of the grooved wheel s, with its notch j' and connections, substantially as described, for the purpose of arresting the motion of the cutting and boring tools at a stated position, and also to arrest the feed at the same time, substantially as described.

<div style="text-align:right">LUCIUS H. DWELLEY.</div>

Witnesses:
P. E. TESCHEMACHER,
N. W. STEARNS.